US007846368B2

(12) United States Patent
Kito

(10) Patent No.: US 7,846,368 B2
(45) Date of Patent: Dec. 7, 2010

(54) MEMORY ELEMENT MOUNTING METHOD AND IMAGE FORMING APPARATUS

(75) Inventor: Eiichi Kito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 602 days.

(21) Appl. No.: 11/834,968

(22) Filed: Aug. 7, 2007

(65) Prior Publication Data

US 2008/0031665 A1 Feb. 7, 2008

Related U.S. Application Data

(62) Division of application No. 11/073,816, filed on Mar. 8, 2005, now abandoned.

(30) Foreign Application Priority Data

Mar. 23, 2004 (JP) ............................ 2004-085169

(51) Int. Cl.
*B29C 43/00* (2006.01)

(52) U.S. Cl. .................. 264/299; 264/272.11; 156/293; 399/341

(58) Field of Classification Search ................. 156/298, 156/308.2, 309.6, 552; 430/124.1; 264/293, 264/272.11, 299
See application file for complete search history.

(56) References Cited

U.S. PATENT DOCUMENTS

| | | | | |
|---|---|---|---|---|
| 3,239,364 | A | 3/1966 | Carlisle et al. | |
| 3,820,545 | A * | 6/1974 | Jefferts | 606/117 |
| 5,132,198 | A | 7/1992 | Tamary | |
| 2002/0170973 | A1 * | 11/2002 | Teraura | 235/492 |
| 2003/0136828 | A1 | 7/2003 | Takesada et al. | |
| 2003/0164974 | A1 * | 9/2003 | Yoda | 358/1.15 |

FOREIGN PATENT DOCUMENTS

| | | | |
|---|---|---|---|
| JP | 2001-126044 | A | 5/2001 |
| JP | 2002-287270 | A | 10/2002 |
| JP | 2003-242465 | A | 8/2003 |
| JP | 2003-286683 | A | 10/2003 |
| JP | 2003-296677 | A | 10/2003 |

* cited by examiner

*Primary Examiner*—John L Goff
(74) *Attorney, Agent, or Firm*—Sughrue Mion, PLLC

(57) ABSTRACT

A memory element mounting method includes: a disposing step of disposing a memory element at a sheet of paper that is composed of plural layers including a first layer serving as a base and a second layer serving as a surface with a thermoplasticity; and a surface treatment step of melting at least the surface of the sheet of paper with the memory element disposed thereat and processing the molten surface of the sheet of paper into a predetermined surface shape. Since the memory element is mounted on the sheet of paper during the surface treatment of the sheet of paper rather than during production of the sheet of paper, the memory element can be mounted on the sheet of paper as required.

2 Claims, 10 Drawing Sheets

MEMORY ELEMENT MOUNTING METHOD AND IMAGE FORMING APPARATUS

This is a divisional of application Ser. No. 11/073,816 filed Mar. 8, 2005, now abandoned. The entire disclosure(s) of the prior application(s), application Ser. No. 11/073,816 is hereby incorporated by reference.

BACKGROUND OF THE INVENTION

1. Field of the Invention

The present invention relates to a memory element mounting method for mounting a memory element on a sheet of paper and an image forming apparatus for forming an image on a sheet of paper.

2. Description of the Related Art

It is common practice to attach bar codes, which represent commodity codes, to commodities and identify each commodity by reading the attached bar code with a bar-code reader (scanner). Associating each commodity with information about the commodity facilitates management of distribution, inventory and selling of commodities.

However, bar codes can provide only limited amounts of information. In addition, since the bar-code information is obtained by reading the bar-code configuration, bar codes are vulnerable to dirt, and the areas of commodities in which bar codes can be attached are restricted. To avoid such disadvantages, in recent years, wireless microchips (that is, IC tags) attached to commodities have become utilized, instead of the bar codes. The IC tags have advantages that one with an adequate data capacity can be chosen according to the purpose thereof and that, since the information is obtained from the IC tag using a radio wave, the IC tag can be disposed inside the commodity package. In addition, there have been developed inexpensive IC tags of various shapes, and IC tags that is supplied with power through an antenna and can be used semipermanently without a battery. Thus, it is expected that IC tags will be attached to all the commodities and widely used for a variety of purposes, not only for the commodity management purpose.

In the field of printing, there has been proposed a technique that attaches an IC tag to a sheet of paper for commodity management or print processing control.

In Japanese Patent Laid-Open No. 2002-287170, there is described a technique that attaches an IC label, in which the image ID, correction information required for image correction or the like is recorded, to the back of a photograph and utilizes the information when placing a repeat order for photograph printing. According to this technique, a repeat order can be easily placed only by bringing the photograph to a photo studio. However, there is a possibility that the IC label may peel off the photograph by a finger scratching the IC label when a user sees the photograph or by the photograph rubbing against another photograph, for example.

Besides, in Japanese Patent Laid-Open No. 2003-286683, there is described a technique that previously embeds an IC element, in which information about a printing procedure is recorded, in a sheet of paper and conducts printing in accordance with the information. In recent years, a microchip that has a length of 0.4 mm, a width of 0.4 mm and a thickness of 0.06 mm (manufactured by Hitachi, Ltd.) has been developed. If such a small IC element is embedded in a sheet of paper, the IC element is not obtrusive when a user sees the print image, and it is possible to eliminate the disadvantage that the IC element peels off.

Here, according to the technique described in Japanese Patent Laid-Open No. 2003-286683, printing is conducted using the sheet of paper in which an IC element is previously embedded. Therefore, there are problems that the IC element may be cut away when cutting the sheet of paper to the size of the print image and that the IC element is wasted if a print requires no IC element.

SUMMARY OF THE INVENTION

The present invention has been made in view of the above circumstances and provides a memory element mounting method and an image forming apparatus for mounting a memory element on a sheet of paper as required.

A memory element mounting method according to the present invention includes:

a disposing step of disposing a memory element at a sheet of paper that is composed of plural layers including a first layer serving as a base and a second layer serving as a surface with a thermoplasticity; and a surface treatment step of melting at least a surface of the sheet of paper at which the memory element is disposed in the disposing step and processing the molten surface of the sheet of paper into a predetermined surface shape.

Typically, it is preferred that the memory element mounting method according to the present invention further includes:

an image forming step of forming a toner image on the second layer, in which the surface treatment step doubles as a fixing step of integrating the toner image on the second layer with the second layer so that the toner image constitutes a portion of the surface of the sheet of paper.

In recent years, there has been proposed an electrophotographic image forming apparatus that forms a toner image on a sheet of paper, sets the toner image, and melts the toner and the surface of the sheet of paper to flatten the surface of the sheet of paper, thereby fixing the toner image on the sheet of paper. Using such an electrophotographic image forming apparatus can produce an image of a high quality comparable to the quality of pictures output by a conventional wet image forming apparatus.

According to the memory element mounting method according to the present invention, the memory element is mounted on the sheet of paper by melting the surface of the sheet of paper on which the memory element is disposed and conducting a surface treatment of the sheet of paper. Therefore, the memory element can be mounted on the sheet of paper during the process of producing the sheet of paper or can be mounted on the previously produced sheet of paper as required.

In particular, according to the typical memory element mounting method according to the present invention, since one step doubles as the fixing step of fixing the toner image and the surface treatment step of mounting the memory element, the electrophotographic image forming apparatus described above can be used to mount the memory element on the sheet of paper without the need for any additional complicated step. In addition, since the position at which the memory element is to be disposed can be determined according to the size of the image to be formed on the sheet of paper, it is possible to avoid the disadvantage that the memory element is cut away when cutting the sheet of paper.

Furthermore, in the memory element mounting method according to the present invention, it is preferred that the disposing step is a step of disposing the memory element on the second layer, and the surface treatment step is a step of integrating the memory element on the second layer with the second layer so that the memory element constitutes a portion of the surface of the sheet of paper.

The memory element can be easily mounted on the sheet of paper by melting the second layer on which the memory element is disposed and integrating the memory element with the second layer.

Furthermore, in the memory element mounting method according to the present invention, it is preferred that the disposing step is a step of embedding the memory element in the second layer.

According to the preferred memory element mounting method, since the memory element can be deeply embedded in the sheet of paper, it is possible to avoid the disadvantage that the memory element is undesirably seen through the sheet of paper, and thus, it is possible to prevent the memory element from affecting the image formed on the sheet of paper.

Furthermore, in the memory element mounting method according to the present invention, it is preferred that the disposing step is a step of embedding the memory element in the first layer.

Since the memory element is embedded in the first layer, the thickness of the second layer can be reduced, and thus, the total thickness of the sheet of paper can be reduced. In addition, since an image can be formed at the area over the memory element having been previously mounted, it is possible to prevent the image from being affected by mounting of the memory element, and the sheet of paper can be utilized efficiently.

In addition, an image forming apparatus according to the present invention includes:

a toner image forming section that forms a toner image on a surface of a sheet of paper that is composed of plural layers including a first layer serving as a base and a second layer serving as the surface with a thermoplasticity;

a disposing section that disposes a memory element at the sheet of paper; and a surface treatment section that melts at least the surface of the sheet of paper at which the memory element is disposed in the disposing step and processes the molten surface of the sheet of paper into a predetermined surface shape.

The image forming apparatus according to the present invention can form an image on a sheet of paper with a memory element mounted on the sheet of paper as required.

Here, as for the image forming apparatus according to the present invention, only a basic configuration thereof has been described above. However, this is intended simply to avoid redundancy, and the image forming apparatus according to the present invention is not limited to the basic configuration but can have various configurations corresponding to the various implementations of the memory element mounting method described above.

According to the present invention, there are provided a memory element mounting method and an image forming apparatus for embedding a memory element in a sheet of paper as required.

DETAILED DESCRIPTION OF THE INVENTION

In the following, embodiments of the present invention will be described.

Figure 1:
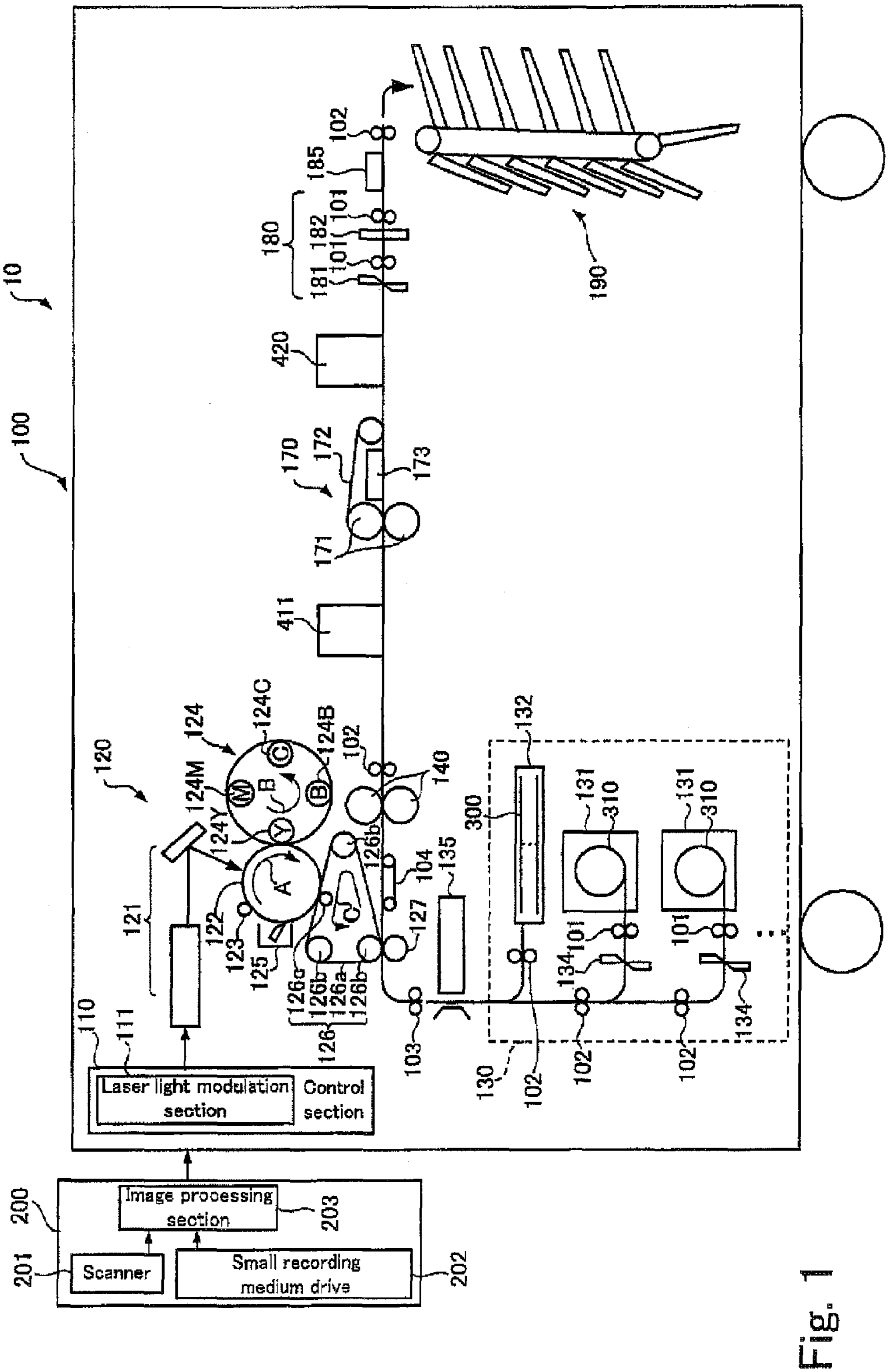
FIG. 1 shows a print system to which the first embodiment of the present invention is applied.

FIG. 1 shows a print system according to the first embodiment of the present invention is applied.

A print system 10 shown in FIG. 1 has a printer 100 and an acceptance device 200.

The acceptance device 200 is to accept a printout order from a user. The acceptance device 200 has a scanner 201 that optically reads a photograph image recorded on a photographic film and produces image data, a small recording medium drive 202 that reads image data, which represents an image taken with a digital camera or the like and is recorded on a small recording medium, from the small recording medium, and an image processing section 203 that receives image data from the scanner 201 or the small recording medium drive 202 and makes a correction, such as tone correction and white balance correction, on the image data. The corrected image data is transferred to the printer 100.

The printer 100 is an electrophotographic printer, which forms an electrostatic latent image, develops the latent image with toner to form a toner image, and finally transfers and fixes the toner image onto a sheet of paper, thereby producing an image constituted by the fixed toner image on the sheet of paper. Specifically, the printer 100 has developing devices for yellow (Y), magenta (M), cyan (C) and black (B) and can print not only a monochrome image but also a full-color image composed of the images of the above-described four colors. In addition, if a sheet of paper with a thermoplastic resin layer applied on the surface is loaded to the printer 100, the printer 100 can make a surface treatment by melting the resin layer, thereby producing an image of high quality comparable to that of photographs. In addition, when printing out an image other than a test image for maintenance or the like, the printer 100 mounts an IC tag on a sheet of paper and writes information or the like about the image to the IC tag. In the following, processings by various components of the printer 100 will be schematically described.

The printer 100 has a control section 110 including a laser light modulation section 111 that modulates laser light emitted by a laser in accordance with image data transmitted from the reception device 200, an image forming section 120 that transfers a toner image onto a sheet of paper fed through a predetermined feeding path, and the like.

The image forming section 120 has an exposure section 121, an image carrying roll 122, an electrification roll 123, a development unit 124, a cleaner 125, an intermediate transfer section 126 and a secondary transfer roll 127.

The surface of the image carrying roll 122 rotating in the direction of the arrow A is electrified by the electrification roll 123, and the exposure section 121, described later, scans the electrified surface of the image carrying roll 122 with laser light modulated in accordance with the image data transmitted from the acceptance device 200 for exposure. In this way, an electrostatic latent image of a predetermined surface potential is formed on the surface of the image carrying roll 122.

The exposure section 121 incorporates an optical system composed of a light source (not shown), such as a semiconductor laser, a polygon mirror, a reflection mirror, various lenses and the like that is appropriately arranged for guiding the laser light from the light source in accordance with the image data received from the acceptance device 200 onto the image carrying roll 122 for scan exposure. The exposure section 121 thus arranged writes the electrostatic latent image onto the image carrying roll 122.

The development unit 124 incorporates developing devices 124Y, 124M, 124C and 124B for the colors of Y, M, C and B located at positions 90 degrees apart. The developing devices 124Y, 124M, 124C and 124B each adopt the so-called magnetic brush development and house a two-component developer containing toner and a carrier. The development unit 124 rotates in the direction of the arrow B on a 90-degrees basis to make any of the developing devices 124Y, 124M, 124C and 124B face close to the image carrying roll 122 at a predetermined short distance. Then, the developing device facing close to the image carrying roll 122 makes the toner adhere to the electrostatic latent image on the surface of the image carrying roll 122 by the action of the magnetic brush effect, thereby forming a toner image of the color of the developing device on the surface of the image carrying roll 122.

The intermediate transfer section 126 has an intermediate transfer belt 126*a* that is stretched in a loop by stretching rolls 126*b* disposed in the loop in such a manner that the intermediate transfer belt 126*a* can move in the direction of the arrow C. In addition, at a primary transfer position where the intermediate transfer belt 126*a* and the image carrying roll 122 face each other at the shortest distance, a primary transfer roll 126*c* is disposed, which applies a transfer voltage to the intermediate transfer belt 126*a*. The toner images formed on the surface of the image carrying roll 122 by the developing devices 124Y, 124M, 124C and 124B in the development unit 124 are transferred onto the intermediate transfer belt 126*a* at the transfer voltage applied at the primary transfer position.

In the case of forming a color image, the exposure section 121 first forms an electrostatic latent image for yellow (Y) on the surface of the image carrying roll 122. Then, the development unit 124 rotates to make the yellow-color developing device 124Y face close to the image carrying roll 122 and make the toner in the yellow-color developing device 124Y adhere to the image carrying roll 122, thereby forming an yellow toner image on the surface of the image carrying roll 122. Then, the yellow toner image is transferred to the intermediate transfer belt 126*a*. Then, the cleaner 125 removes the remaining toner from the surface of the image carrying roll 122, and the exposure section 121 forms an electrostatic latent image for magenta (M) on the surface of the image carrying roll 122. Then, the development unit 124 rotates 90 degrees to make the magenta-color developing device 124M face close to the image carrying roll 122 and make the toner in the magenta-color developing device 124M adhere to the surface of the image carrying roll 122, thereby forming a magenta toner image on the surface of the image carrying roll 122. The magenta toner image is transferred onto the intermediate transfer belt 126*a*, overlaying the previously formed yellow toner image. Then, through the same operations, a cyan (C) toner image and a black (B) toner image are successively transferred onto the intermediate transfer belt 126*a*. In this process, the stretching rolls 126*b* that move the intermediate transfer belt 126*a* is controlled by the control section 110 so that the toner images of the four colors successively transferred and overlaying each other are precisely aligned.

Besides, in the case of forming a monochrome image, only the black (B) toner image is transferred onto the intermediate transfer belt 126*a* in the same manner as described above.

The toner images transferred on the intermediate transfer belt 126*a* through the operations described above are further transferred onto a sheet of paper fed from a medium supply section 130, described later, by the secondary transfer roll 127 disposed facing one of the stretching rolls 126*b* with the intermediate transfer belt 126*a* interposed there between. As a result, a color or monochrome toner image is formed on the surface of the sheet of paper.

Now, the medium supply section 130 in the printer 100 which supplies a sheet of paper to the image forming section 120 described above will be described.

The medium supply section 130 has a roll paper housing section 131 in which a long roll of paper 310 is loaded.

The roll paper 310 is drawn from the roll paper housing section 131 by a positioning roll 101 disposed close to a roll paper outlet slot of the roll paper housing section 131 and fed to a roll paper cutter 134 disposed downstream of the positioning roll 101 in the medium feeding path. Then, the roll paper 310 is positioned by the positioning roll 101 and cut into a predetermined length by the roll cutter 134. The positioning roll 101 is controlled by the control section 110 so as to position the roll paper 310 according to the cut length.

A cut sheet of recording paper from the roll paper housing section 131 is fed through a feeding path formed by feeding rolls 102 disposed at various positions in the printer 100 by the feeding rolls 102.

In addition, the medium supply section 130 has a sheet cassette 132 that houses recording sheets of paper 300. A recording sheet 300 is drawn from the sheet cassette 132 by a feeding roll 102 disposed close to a recording sheet outlet slot of the sheet cassette 132 and fed downstream along the feeding path.

The feeding path from the roll paper cutter 134 and the feeding path from the sheet cassette 132 merge into one path at a downstream point, and a print head 135 that conducts printing on a blank area of the fed recording paper is disposed over the path. In this example, the print head prints the date of shooting of the image or the like.

Once the print head 135 completes printing on the blank area, the recording paper is fed by a resist roll 103 disposed downstream of the print head 135 to the secondary transfer roll 127 of the image forming section 120 described above, which is located further downstream along the feeding path, in a timed manner as described later. Then, the secondary transfer roll 127 transfers the color or monochrome toner image previously formed on the intermediate transfer belt 126*a* onto the fed recording paper.

As described above, in the case where a color toner image is formed on the intermediate transfer belt 126*a*, the intermediate transfer belt 126*a* makes four rotations in the direction of the arrow C, and the four toner images of the colors of Y, M, C and B are transferred onto the intermediate transfer belt 126*a* one by one for each rotation. According to this embodiment, in the case where a color toner image is formed on the intermediate transfer belt 126*a*, the resist roll 103 feeds the sheet of paper to the secondary transfer roll 127 in such a timed manner that the sheet of paper arrives at the secondary transfer roll 127 when the color toner image on the intermediate transfer belt 126*a*, which is composed of the four toner images transferred thereto, faces the secondary transfer roll 127 for the first time. The resist roll 103 is controlled by the control section 110 so as to feed the sheet of paper in such a timed manner.

The sheet of paper with the toner image transferred thereon through the procedure described above is placed on a feeding belt 104 disposed downstream of the secondary transfer roll 127 and fed to a primary fixing section 140 disposed further downstream along the feeding path. The sheet of paper with the toner image transferred thereon is heated and pressured in the primary fixing section 140, and the toner image is fixed to the sheet of paper by the heating and pressurization. The combination of the image forming section 120 and the primary fixing section 140 is an example of a toner image forming section of an image forming apparatus according to the present invention. Here, the image obtained by the primary fixing section 140 fixing the toner image has a quality comparable to that of images produced by color copier or the like, although the quality is inferior to the high quality of photographic images or the like.

The sheet of paper having been subject to the processing in the primary fixing section 140 is fed to an IC tag mounting section 411.

The IC tag mounting section 411 is an example of a disposing section of the image forming apparatus according to the present invention. In response to an instruction from the control section 110, the IC tag mounting section 411 disposes a small IC tag on the fed sheet of paper. A method of disposing the IC tag will be described in detail later. The sheet of paper with the IC tag disposed thereon is fed to a secondary fixing section 170. Here, in the case of printing out a test image for maintenance or the like, the control section 110 instructs the IC tag mounting section 411 not to dispose any IC tag on the sheet of paper, and thus, the sheet of paper passes through the IC tag mounting section 411 without being processed and is fed to the secondary fixing section 170.

The secondary fixing section 170 is to conduct a surface treatment of sheets of paper and is composed of heating and pressurizing rolls 171 that heat and pressurize a fed sheet of paper, a secondary fixing belt 172 that circularly moves and a cooler 173 that cools the sheet of paper heated by the heating and pressurizing rolls 171. The secondary fixing section 170 is an example of a surface treatment section of the image forming apparatus according to the present invention.

Here, in the description of this example, it is supposed that the secondary fixing section 170 conducts a surface treatment for smoothing and glossing the surface of the toner image, and the secondary fixing belt 172 has a smooth glossy surface. However, alternatively, the secondary fixing section 170 may conduct a mat treatment for tarnishing the surface of the toner image to give a certain visual effect to a person who sees the image. In such a case, the secondary fixing belt of the secondary fixing section has a textured surface intended to tarnish the surface of the toner image. Furthermore, the secondary fixing section may process the surface of the toner image into a relief-like surface with predetermined projections and depressions. In such a case, the secondary fixing belt of the secondary fixing section has a surface with projections and depressions intended to process the surface of the toner image into a desired relief-like surface.

In the secondary fixing section 170, the heating and pressurizing rolls 171 heats the toner image fixed to the sheet of paper in the primary fixing section 140 to melt the same, and the surface of the molten toner image is pressed to the smooth glossy surface of the secondary fixing belt 172. Then, the sheet of paper, stuck to the glossy surface of the secondary fixing belt 172, is fed downstream, and the sheet of paper stuck to the glossy surface is cooled by the cooler 173 disposed downstream of the heating and pressurizing rolls 171. Thus, the molten toner image on the sheet is set. Then, the sheet is further fed downstream, and as the secondary fixing belt 172 turns back, the sheet peels off the secondary fixing belt 172 by the action of the rigidity of the sheet itself.

Here, since a thermoplastic resin layer is formed on the surface of the sheet of paper as described above, on the surface of the sheet of paper having experienced the processing in the primary fixing section 140, the toner image is fixed on the resin layer. If the sheet of paper in this state is subject to the processing by the secondary fixing section 170, the resin layer and the toner image are molten together, mixed with each other, pressed to the glossy surface of the secondary fixing belt 172 and set with being uniformly flattened. In this process, if an IC tag has been disposed on the sheet of paper, the surface of the sheet is flattened so that the bump formed by the IC tag is made flush with the surrounding areas. Such a process conducted by the secondary fixing section 170 provides a high quality image with a gloss comparable to that of picture images.

The sheet of paper having passed through the secondary fixing section 170 is fed to an information recording section 420.

The information recording section 420 writes information to the IC tag mounted on the sheet of paper. In this example, information written by the information recording section 420 includes the image ID of the image formed on the sheet, the print size, the date of photograph of the image, and various image forming parameters set by the operator, for example. Here, a sheet of paper with no IC tag mounted thereon passes through the information recording section 420 without being processed.

The sheet of paper having passed through the information recording section 420 is fed to an XY cutter unit 180.

The XY cutter unit 180 has a first cutter 181 that cuts the fed sheet of paper widthwise and a second cutter 182 that cuts the sheet lengthwise, and the first cutter 181 and the second cutter 182 are arranged in series in the feeding path. In addition, positioning rolls 101 are disposed between the first cutter 181 and the second cutter 182 and downstream of the second cutter 182 and position the sheet of paper with respect to the XY cutter unit 180. The positioning of the sheet of paper by the positioning rolls 101 is conducted under the control of the control section 110.

Besides, cutting of the sheet of paper by the XY cutter unit 180 is achieved based on settings by the operator so as to meet requests from a customer. For example, in the case where the sheet of paper fed to the XY cutter unit 180 is one cut from the long roll of paper 130 has a bigger size than a specified print size, the XY cutter unit 180 cuts the sheet of paper to the specified print size. Alternatively, for example, in the case where the sheet of paper fed to the XY cutter unit 180 is a cut sheet of paper supplied from the sheet cassette 132, the sheet of paper is fed to a sorter 190, described later, without being cut by the XY cutter unit 180. Alternatively, for example, in the case of printing an image on a sheet of paper of predetermined dimensions, such as a postcard, the sheet of paper is fed to the sorter 190, described later, without being cut.

The sheets of paper having been subject to processings including fixing and cutting described above are fed to the sorter 190 disposed at the downstream end of the feeding path and stacked therein. The sheets of paper are stacked in the sorter 190 in the following manner, for example. That is, once a batch of sheets of paper for one roll of film is stored in a storage section at a predetermined storing position, the sorter 190 rotates to position an empty storage section at the storing position. Then, a next batch of sheets of paper is stored in the empty storage section. In this way, all the batches of sheets of paper are stored in the storage sections on a batch basis. Here, the operation of the sorter 190 is controlled by the control section 110.

The series of image forming processings described above allows formation of a high quality image on a sheet of paper.

Here, a characteristic of the print system 10 according to this embodiment of the present invention shown in FIG. 1 lies in a series of processings for embedding an IC tag to a sheet of paper.

Figure 2:
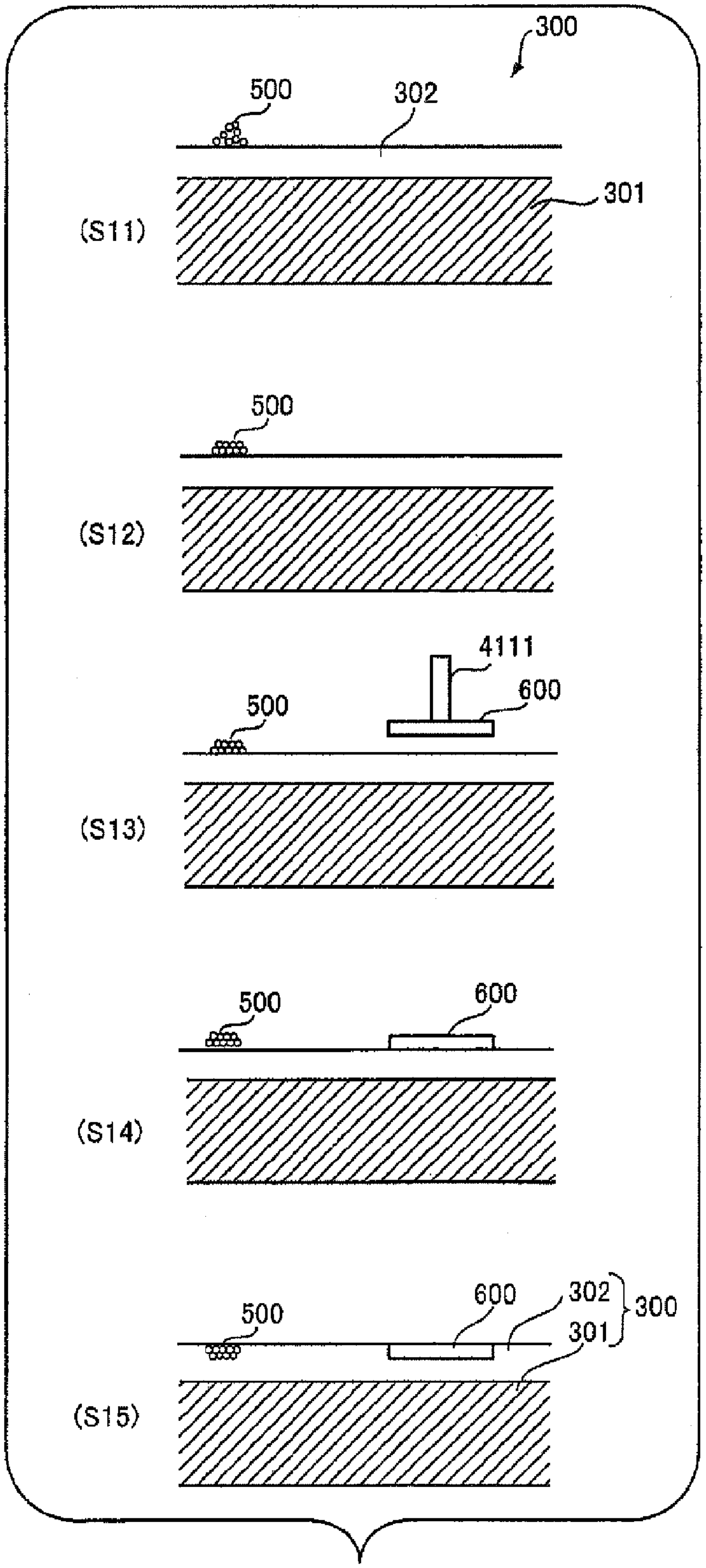
FIG. 2 illustrates a procedure of mounting an IC tag on a sheet of paper according to a memory element mounting method according to the first embodiment of the present invention.

FIG. 2 illustrates a procedure of mounting an IC tag on a sheet of paper according to a memory element mounting method according to the first embodiment of the present invention. In the following, with reference to FIGS. 1 and 2, the memory element mounting method according to the first embodiment of the present invention will be described.

A sheet of paper 300 is composed of a base 301 and a thermoplastic resin layer 302 covering the surface of the base 301. The base 301 is an example of a first layer according to the present invention, and the resin layer 302 is an example of a second layer according to the present invention. First, in the image forming section 120 shown in FIG. 1, a toner image 500 is formed on the sheet of paper 300 (as shown in part S11 of FIG. 2).

Then, in the primary fixing section 140 shown in FIG. 1, the toner image 500 is fixed to the sheet of paper 300 (as shown in part S12 of FIG. 2). A combination of the processings shown in parts S11 and S12 is an example of a toner image forming step of the memory element mounting method according to the present invention.

The sheet of paper 300 having been subject to the primary fixing is fed to the IC tag mounting section 411. In the IC tag mounting section 411, an IC tag carrier 4111 carries an IC tag 600 to the sheet of paper 300 (as shown in part S13 of FIG. 2). The IC tag 600 is an example of a memory element according to the present invention.

The IC tag carrier 4111 disposes the IC tag 600 on the resin layer 302 of the sheet of paper 300 (as shown in part S14 of FIG. 2). The processing shown in part S14 of FIG. 2 is an example of a disposing step of the memory element mounting method according to the present invention.

The sheet of paper 300 with the IC tag 600 disposed thereon is fed to the secondary fixing section 170. In the secondary fixing section 170, the heating and pressurizing rolls 171 melt the resin layer 302 of the sheet of paper 300 and the toner image 500 thereon. Then, the sheet of paper 300 is pressed to the secondary fixing belt 172 to gloss the surface of the sheet of paper 300 (as shown in part S15 of FIG. 2). At this time, to prevent the IC tag 600 from projecting from the surface of the sheet of paper 300, the surface of the sheet of paper 300 is uniformly flattened. This surface treatment processing of the sheet of paper 300 is an example of a surface treatment step of the memory element mounting method according to the present invention and is also a fixing step of the memory element mounting method according to the present invention.

The sheet of paper 300 having been subject to the surface treatment processing is cooled by the cooler 173 and fed to the sorter 190 through the information recording section 420.

As described above, according to the memory element mounting method according to the present invention, the IC tag 600 can be mounted on the sheet of paper 300 only if necessary, so that it is possible to prevent the IC tag 600 from being wasted. In addition, since the secondary fixing section 170 conducts the surface treatment processing and the encapsulation of the IC tag, the IC tag 600 can be mounted on the sheet of paper using a conventional printer without needing any additional steps.

So far, the first embodiment of the present invention has been described. Now, a second embodiment of the present invention will be described. The following description will be focused on differences from the first embodiment, and redundancy of description will be avoided.

Figure 3:
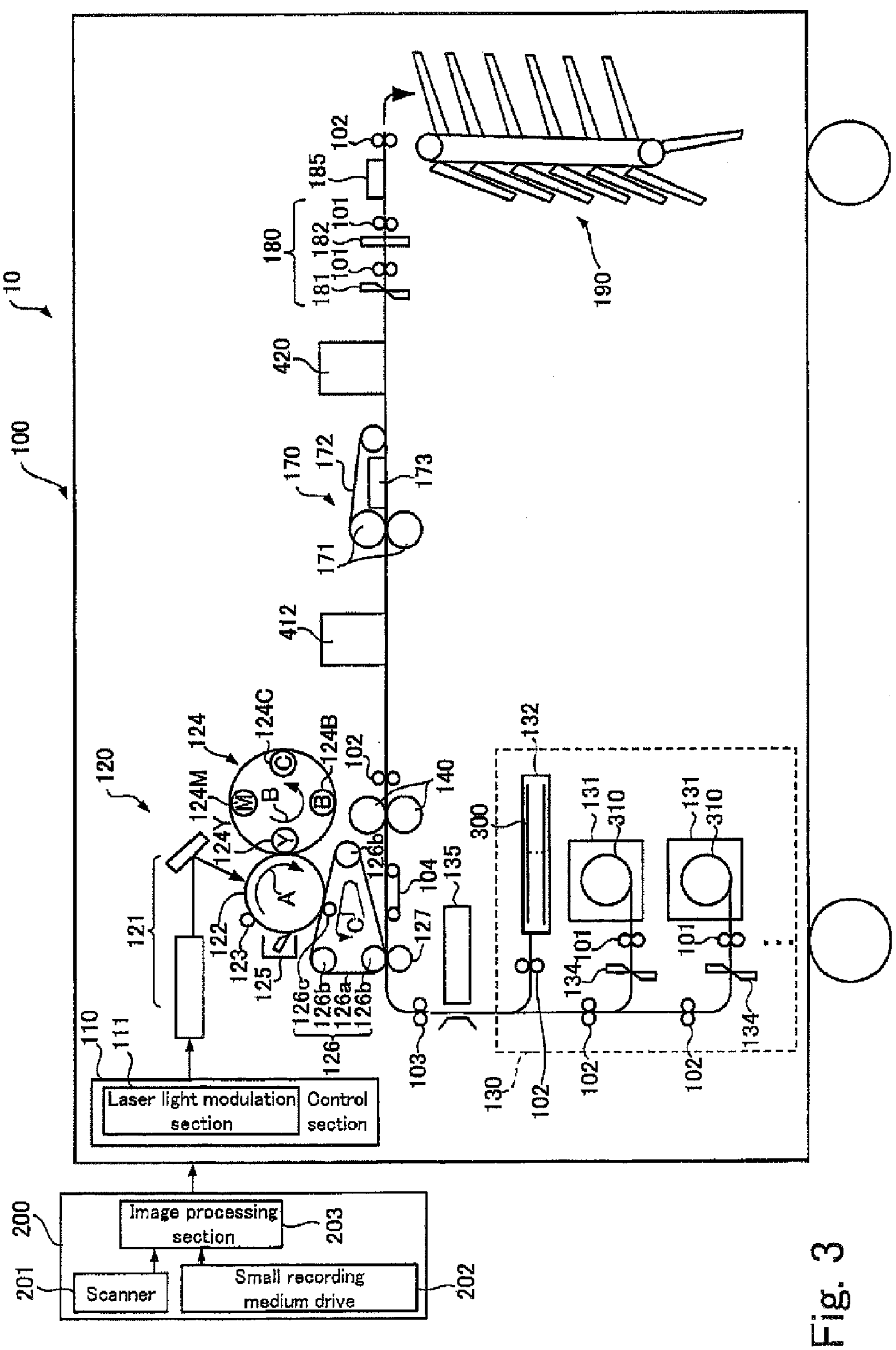
FIG. 3 shows a printer according to a second embodiment of the present invention.

FIG. 3 shows a printer according to the second embodiment of the present invention.

The printer according to this embodiment shown in FIG. 3 is configured substantially the same as the printer according to the first embodiment shown in FIG. 1, except that it has an IC tag mounting section 412 instead of the IC tag mounting section 411 shown in FIG. 1.

Figure 4:
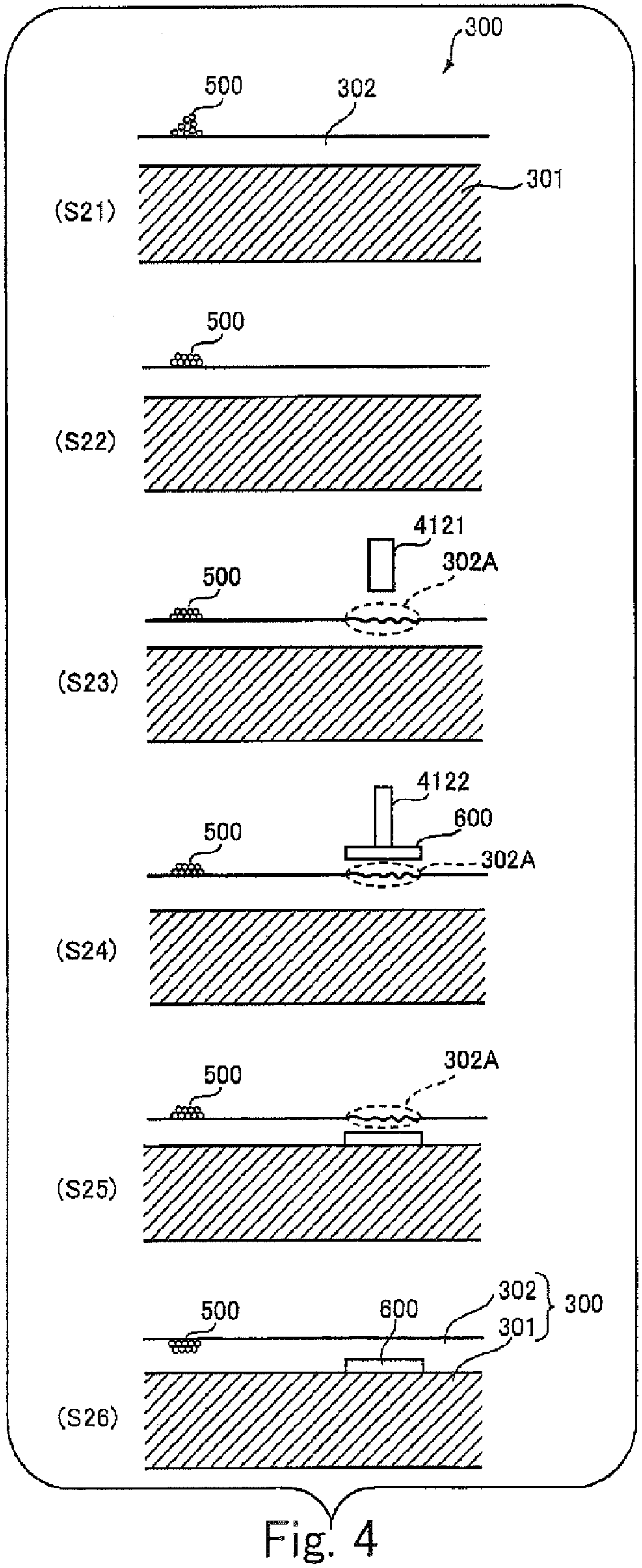
FIG. 4 illustrates a procedure of mounting an IC tag on a sheet of paper according to a memory element mounting method according to the second embodiment of the present invention.

FIG. 4 illustrates a procedure of mounting an IC tag on a sheet of paper according to a memory element mounting method according to the second embodiment of the present invention.

First, as in the first embodiment, in an image forming section 120 shown in FIG. 3, a toner image 500 is formed on a sheet of paper 300 (as shown in part S21 of FIG. 4), and in a primary fixing section 140, the toner image 500 is fixed to the sheet of paper 300 (as shown in part S22 of FIG. 4).

Then, the sheet of paper 300 is fed to the IC tag mounting section 412. In the IC tag mounting section 412, a heater 4121 heats a portion 302A of a resin layer 302 of the sheet of paper 300 to melt the portion 302A (as shown in part S23 of FIG. 4).

Then, an IC tag carrier 4122 carries an IC tag 600 (as shown in part S24 of FIG. 4) and disposes the IC tag 600 on the molten portion 302A of the sheet of paper 300 (as shown in part S25 of FIG. 4). At this time, the IC tag 600 is embedded in the molten portion 302A of the resin layer 302 close to the boundary between the base 301 and the resin layer 302.

The sheet of paper 300 with the IC tag 600 disposed therein is fed to a secondary fixing section 170 and is subject to a surface treatment therein (as shown in part S26 of FIG. 4).

In this way, according to the memory element mounting method according to this embodiment, the IC tag 600 can be deeply embedded in the resin layer 302 to a depth close to the boundary between the resin layer 302 and the base 301. Therefore, it is possible to eliminate a disadvantage that the IC tag 600 is undesirably seen through the sheet of paper 300.

So far, the second embodiment of the present invention has been described. Now, a third embodiment of the present invention will be described. The following description will be focused on differences from the first and second embodiments, and redundancy of description will be avoided.

Figure 5:
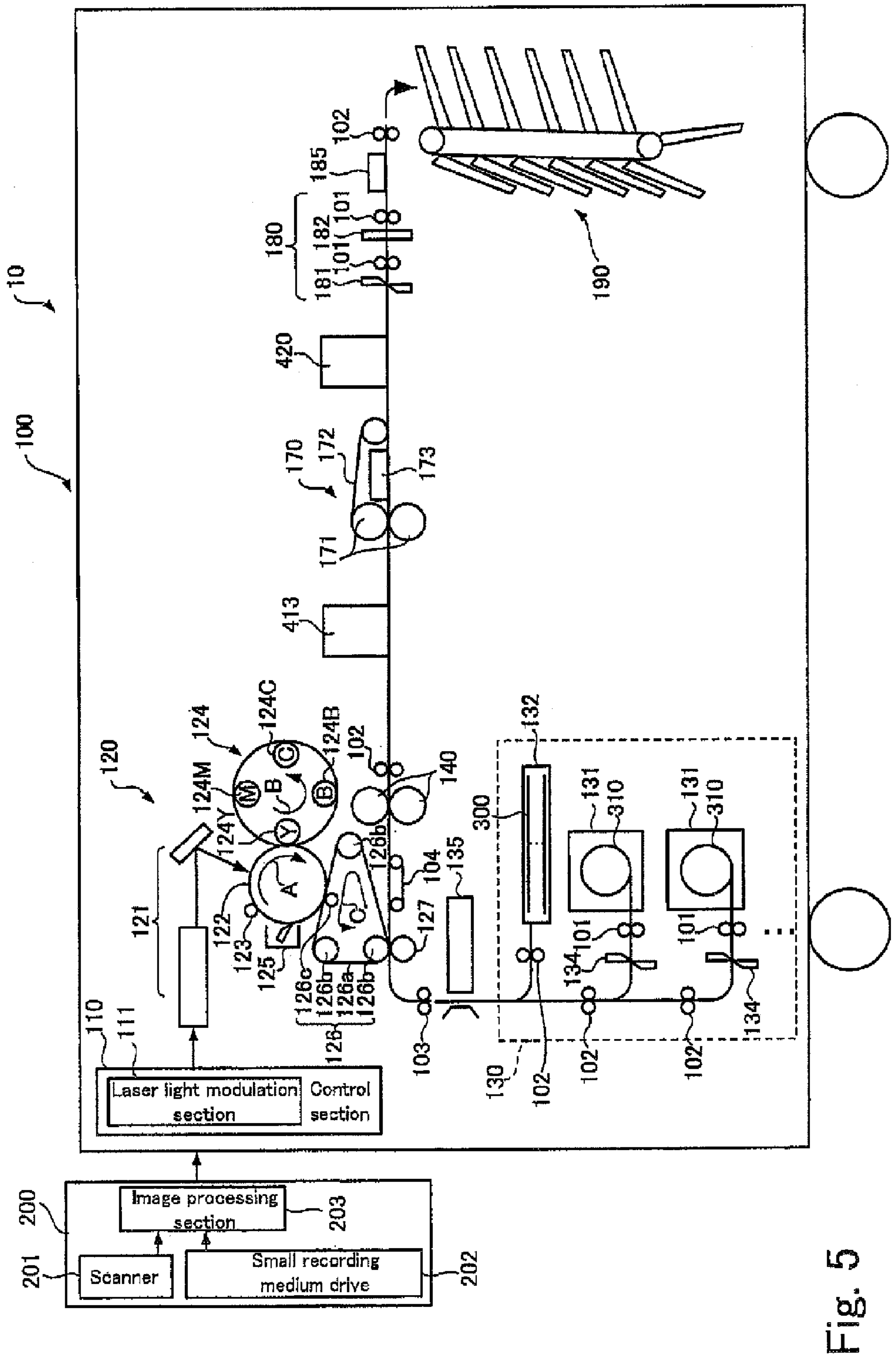
FIG. 5 shows a printer according to a third embodiment of the present invention.

FIG. 5 shows a printer according to the third embodiment of the present invention.

The printer according to this embodiment shown in FIG. 5 is also configured substantially the same as the printer according to the first embodiment shown in FIG. 1, except that it has an IC tag mounting section 413 instead of the IC tag mounting section 411 shown in FIG. 1.

Figure 6:
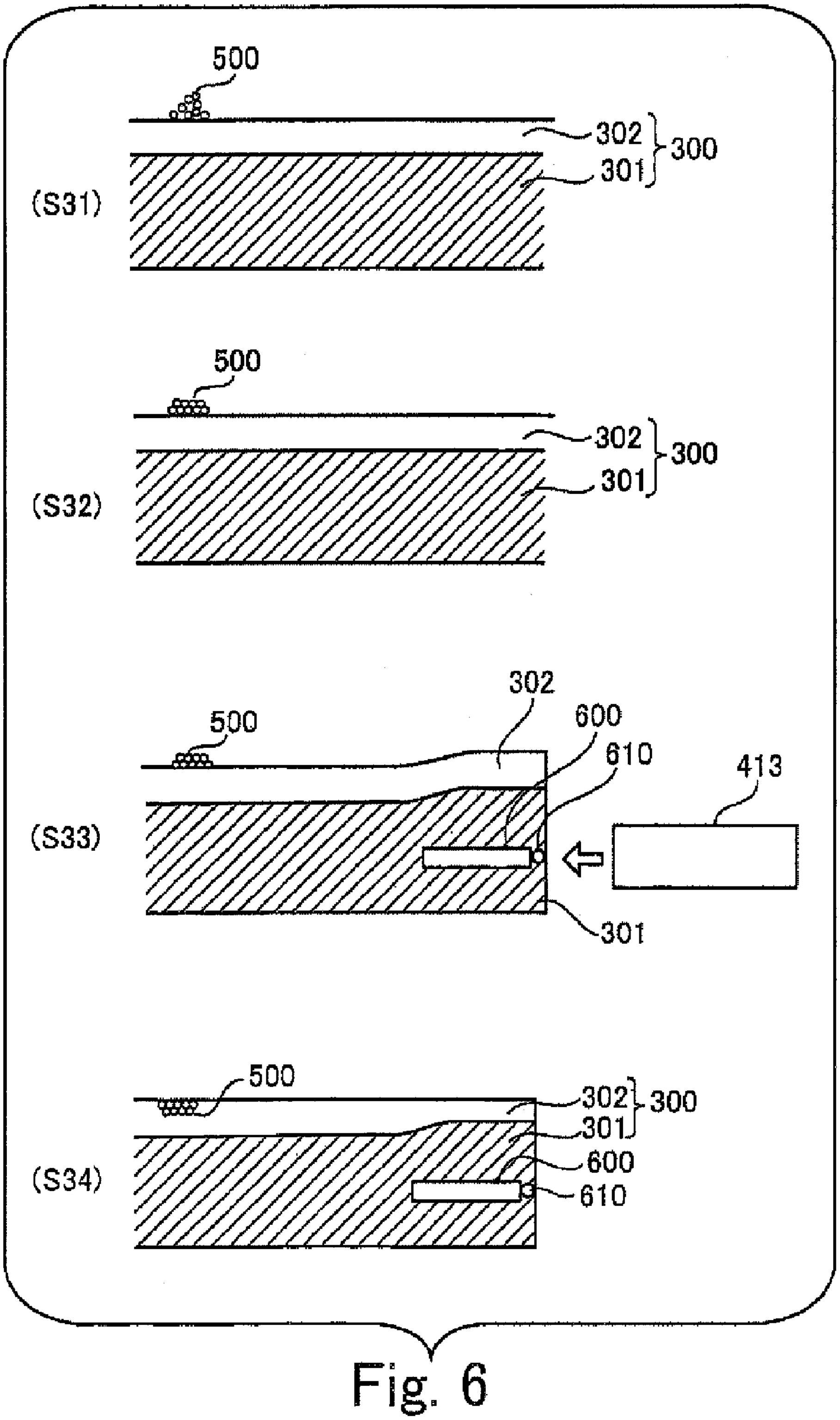
FIG. 6 illustrates a procedure of mounting an IC tag on a sheet of paper according to a memory element mounting method according to the third embodiment of the present invention.

FIG. 6 illustrates a procedure of mounting an IC tag on a sheet of paper according to a memory element mounting method according to the third embodiment of the present invention.

First, as in the first and second embodiments, a toner image 500 is formed on a sheet of paper 300 (as shown in part S31 of FIG. 6), and the toner image 500 is fixed to the sheet of paper 300 (as shown in part S32 of FIG. 6).

Then, an IC tag 600 is disposed on the sheet of paper 300. The IC tag 600 is embedded in a base 301 rather than a resin layer 302 in this embodiment, while the IC tag 600 is disposed on the resin layer 302 of the sheet of paper 300 in the first and second embodiments.

Here, putting aside the description of FIG. 6, a configuration of the IC tag mounting section 413 according to this embodiment will now be described.

Figure 7:
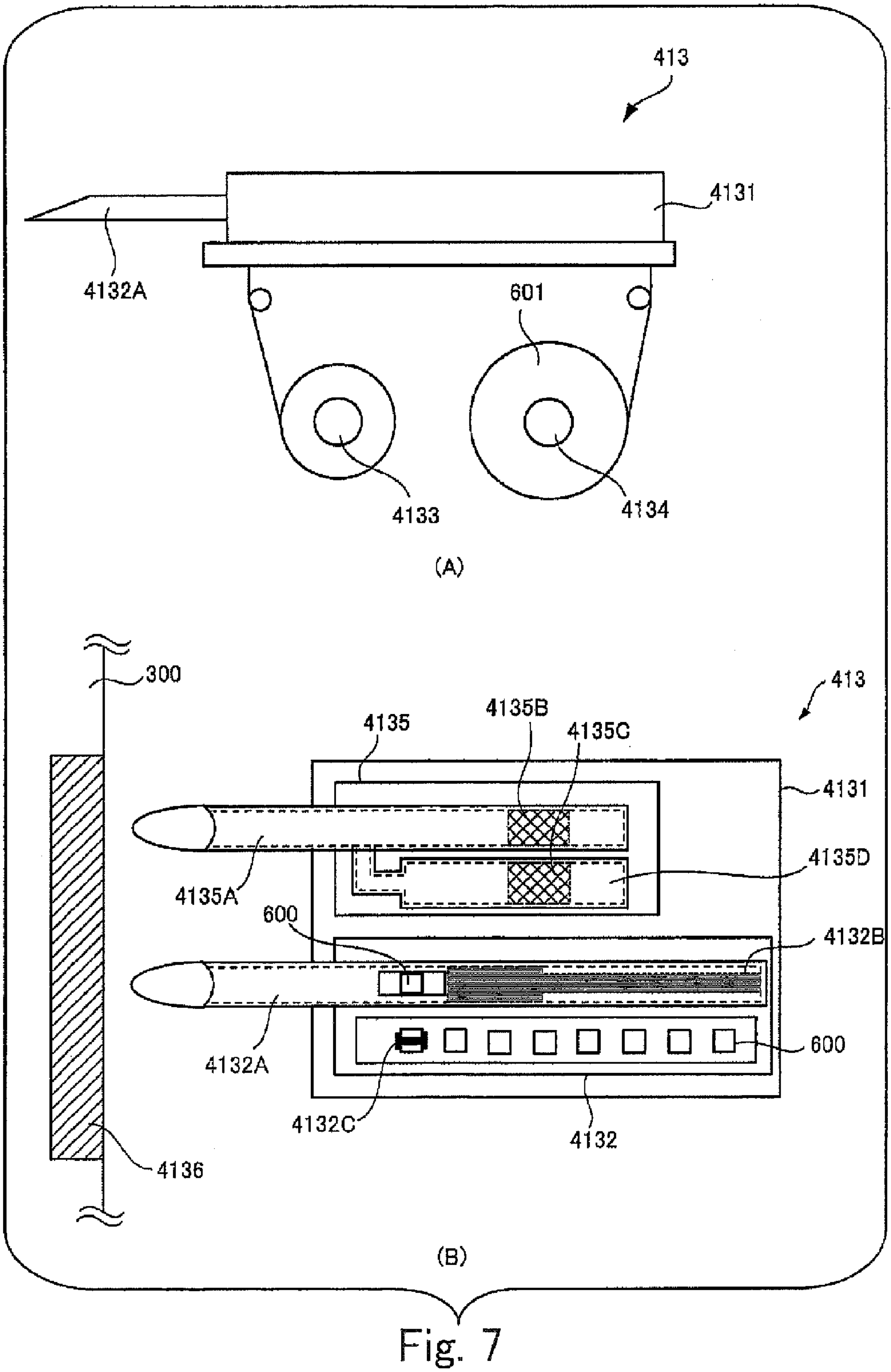
FIG. 7 shows a configuration of an IC tag mounting section.

FIG. 7 shows a configuration of the IC tag mounting section.

The IC tag mounting section 413 according to this embodiment has an IC tag insertion section 4131 that inserts the IC tag 600 into the base 301 of the sheet of paper 300 and a presser plate 4136 that holds the sheet of paper 300.

Part (A) of FIG. 7 is a side view of the IC tag insertion section 4131. IC tags 600 are stuck on a tape 601 in series and supplied to an IC tag insertion needle 4132A by the action of a tape feeding section 4134. The part of the tape 601 that has released IC tags 600 is collected by being wound by a tape winding section 4133.

Part (B) of FIG. 7 is a top view of the IC tag insertion section 4131. The IC tag insertion section 4131 has an IC tag insertion block 4132 having the IC tag insertion needle 4132A shown also in part (A), an IC tag insertion piston 4132B and an IC tag setting claw 4132C, and an adhesive injection block 4135 having an adhesive injection needle 4135A, an adhesive injection piston 4135B, an adhesive replenishment piston 4135C and an adhesive reservoir 4135D.

When the sheet of paper 300 is fed to the IC tag mounting section 413, the presser plate 4136 first holds the sheet of paper 300. Then, the IC tag setting claw 4132C sets an IC tag 600 stuck on the tape 601 into the IC tag insertion needle 4132A.

Once the IC tag 600 is set, the IC tag insertion block 4132 is moved to insert the IC tag insertion needle 4132A into the base 301 of the sheet of paper 300. Furthermore, the IC tag insertion piston 4132B inserts the IC tag 600 into the base 301.

Then, the adhesive injection block 4135 is moved to insert the adhesive injection needle 4135A into the base 301, and the adhesive injection piston 4135B injects an adhesive into the base 301.

Now, description of FIG. 6 will be reverted to.

As shown in part S33 of FIG. 6, the IC tag mounting section 413 inserts the IC tag 600 and injects an adhesive 610 into the base 301 of the sheet of paper 300. The adhesive 610 serves as a sealant for preventing dropping of the IC tag 600 and is preferably a one-component adhesive, such as a poly acetate vinyl resin, a polyvinyl alcohol resin and a cellulose adhesive.

The sheet of paper 300 with the IC tag 600 disposed therein is fed to a secondary fixing section 170, in which the sheet of paper 300 is subject to a surface treatment (as shown in part S34 of FIG. 6).

In this way, according to the memory element mounting method according to this embodiment, since the IC tag 600 is embedded into the base 301 rather than the resin layer 302, the resin layer 302 can be thinner than the IC tag 600, so that the total thickness of the sheet of paper 300 can be reduced.

So far, the third embodiment of the present invention has been described. Now, a fourth embodiment of the present invention will be described. The following description will be focused on differences from the first to third embodiments, and redundancy of description will be avoided.

Figure 8:
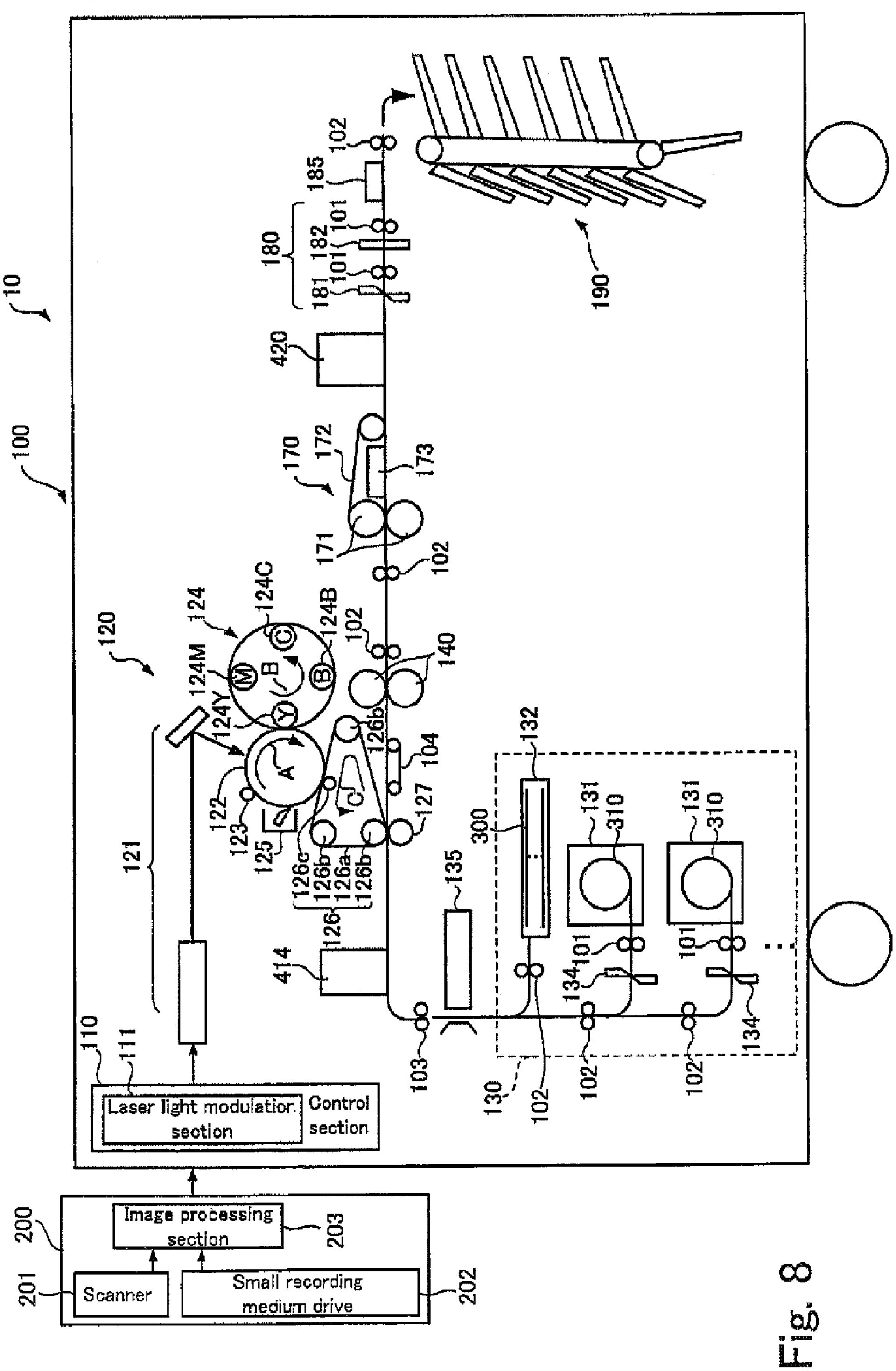
FIG. 8 shows a printer according to a fourth embodiment of the present invention.

FIG. 8 shows a printer according to the fourth embodiment of the present invention.

The printer according to this embodiment shown in FIG. 8 is configured substantially the same as the printer according to the first embodiment shown in FIG. 1, except that the IC tag mounting section is located at a different position. In the printer according to this embodiment, an IC tag mounting section 414 is located upstream of an image forming section 120, and an IC tag is disposed on a sheet of paper before a toner image is formed on the sheet of paper.

Figure 9:
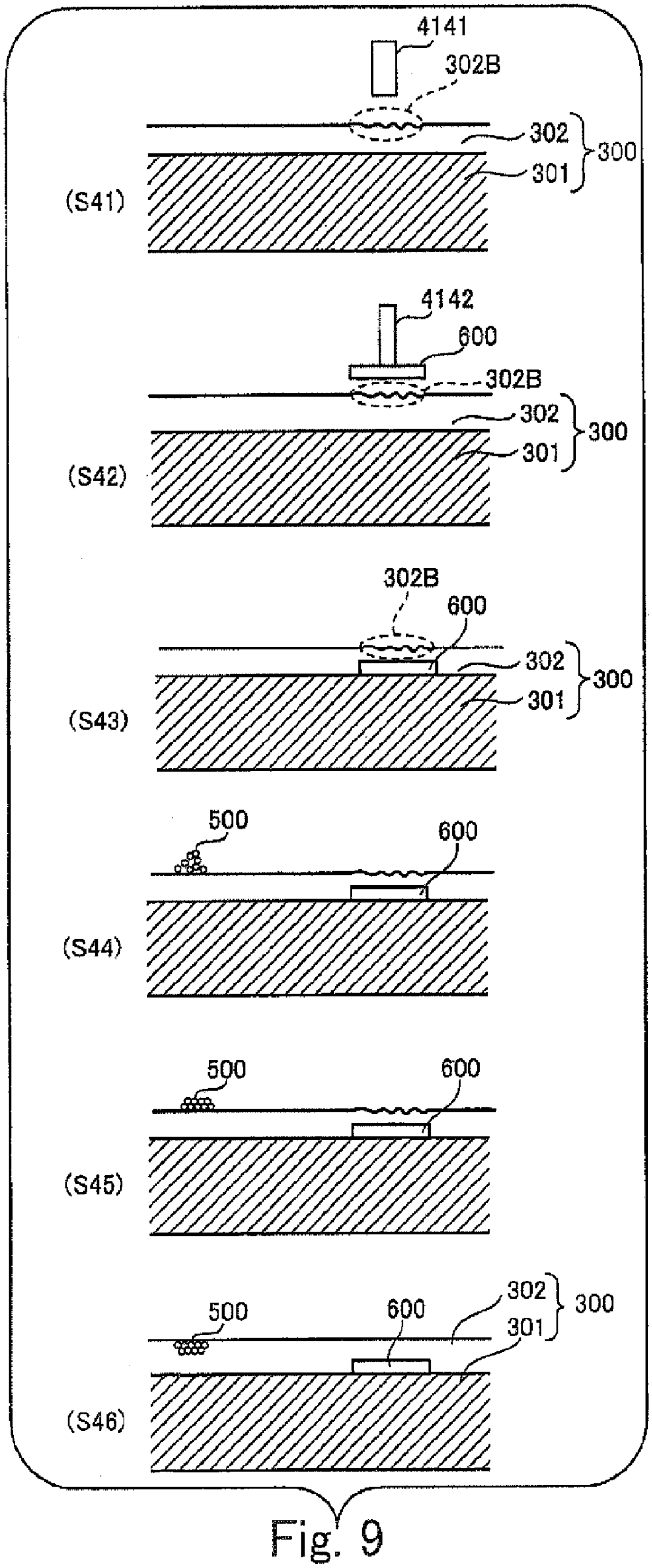
FIG. 9 illustrates a procedure of mounting an IC tag on a sheet of paper according to a memory element mounting method according to the fourth embodiment of the present invention.

FIG. 9 illustrates a procedure of mounting an IC tag on a sheet of paper according to a memory element mounting method according to the fourth embodiment of the present invention.

According to the memory element mounting method according to this embodiment, an IC tag is embedded into a sheet of paper 300 before a toner image is formed on the sheet of paper 300. First, the sheet of paper 300 is fed from a medium supply section 130 to the IC tag mounting section 414, and a heater 4141 of the IC tag mounting section 414 heats a portion 302B of a resin layer 302 of the sheet of paper 300 to melt the portion 302B (as shown in part S41 of FIG. 9).

Then, an IC tag 600 is carried by an IC tag carrier 4142 (as shown in part S42 of FIG. 9) and embedded in the molten portion 302B close to the boundary between the resin layer 302 and the base 301 (as shown in part S43 of FIG. 9).

The sheet of paper 300 with the IC tag 600 embedded is fed to an image forming section 120, and a toner image 500 is formed on the resin layer 302 (as shown in part S44 of FIG. 9).

The sheet of paper 300 therein is fed to a primary fixing section 140, in which a toner image 500 is fixed onto the sheet of paper 300 (as shown in part S45 of FIG. 9).

The sheet of paper 300 with the toner image 500 fixed thereto is fed to a secondary fixing section 170, in which the sheet of paper 300 is subject to a surface treatment (as shown in part S46 of FIG. 9).

In this way, according to the memory element mounting method according to this embodiment, since the toner image 500 is formed on the sheet of paper with the IC tag 600 previously embedded therein, it is possible to avoid degradation of the toner image 500 by mounting of the IC tag 600, so that a high quality image can be formed.

So far, the fourth embodiment of the present invention has been described.

In the following, exemplary utilization of information recorded in the IC tag 600 will be described.

Figure 10:
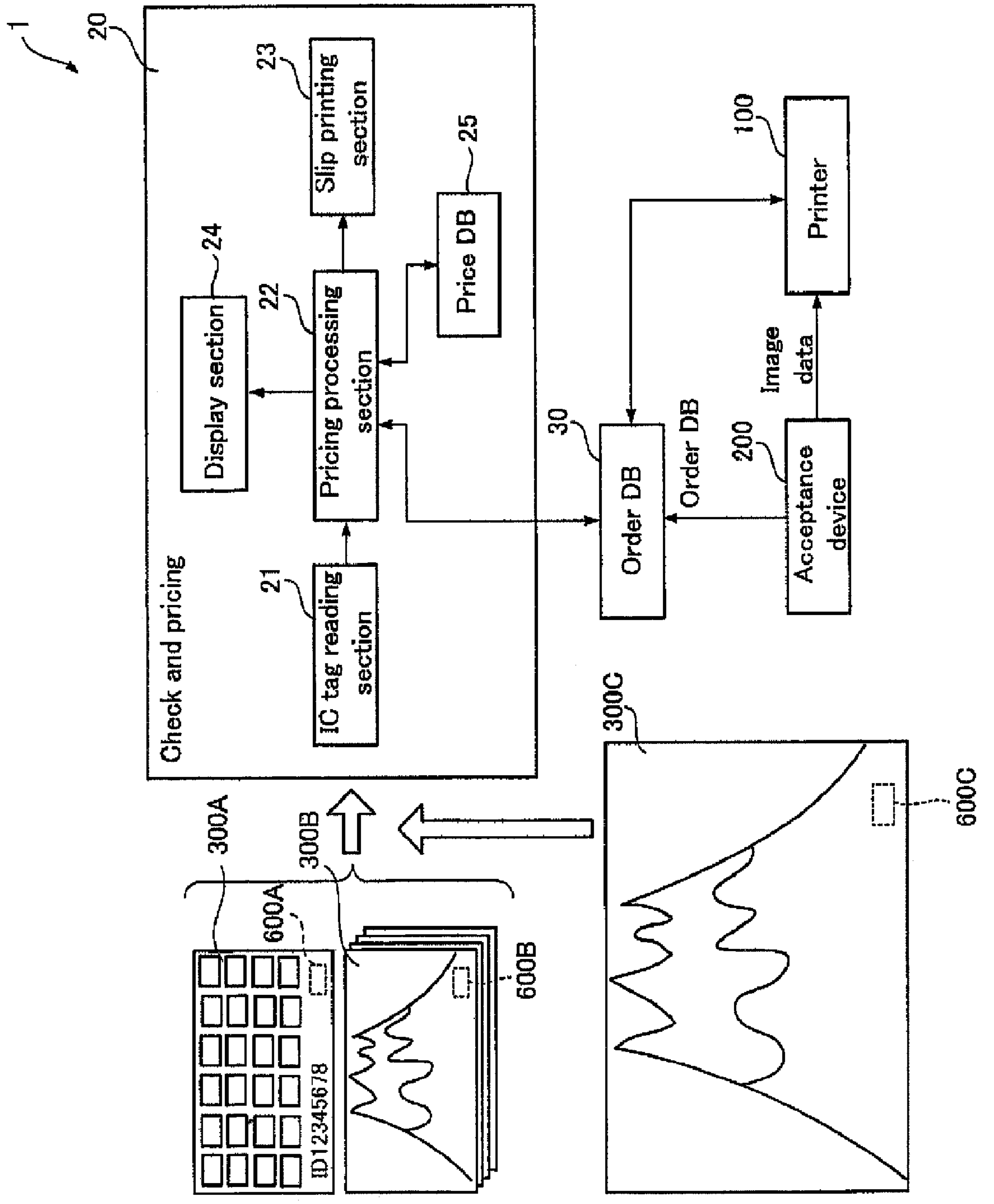
FIG. 10 is a block diagram showing an order acceptance system that accepts an order from a user, prints out an image and calculates the printing fee.

FIG. 10 is a block diagram showing an order acceptance system that accepts an order from a user, prints out an image and calculates the printing fee.

An order acceptance system 1 is composed of an acceptance device 200 that accepts an order from a user shown also in FIGS. 1, 3, 5 and 8, a printer 100 that prints out an image, an order DB 30 that stores order data representing details of the order, and a pricing device 20 that reads information recorded in an IC tag 600 (600A, 600B, 600C) and calculates the printing fee.

Once a roll of film or a small recording medium is loaded to the acceptance device 200, and an order for printout of a photographed image is placed, order data representing details of the order is sent to and stored in the order DB 30. In addition, the acceptance device 200 produces image data representing the photographed image, and the image data is sent to the printer 100.

The printer 100 prints out an image based on the image data sent from the acceptance device 200. In the following description of this example, it is supposed that the printer 100 prints out a normal print image 3003, an enlarged print image 300C and an index image 300A that contains an index of all the print images. On the normal print image 300B and the enlarged print image 300C, there are mounted the IC tags 600B and 600C, respectively, in which the image ID, the print size, the date of photograph, various previously-set image forming parameters and the like are recorded. On the index image 300A, there is mounted the IC tag 600A in which image IDs of all the print images and the like are recorded.

The operator loads the printed index image 300A, normal print image 300B and enlarged print image 300C into the pricing device 20.

The pricing device 20 is composed of an IC tag reading section 21 that reads information recorded in the IC tag 600, a pricing processing section 22 that calculates the printing fee, a slip printing section 23 that outputs a slip, a display section 24 that displays an image or an error notification, and a price DB 25 that stores a correspondence between print sizes and surface treatment types and their respective prices.

Once a print image is loaded into the pricing device 20, first, the IC tag reading section 21 reads the information recorded in the IC tag 600. The pricing processing section 22 compares the "image IDs of all the print images", recorded in the IC tag 600A on the index image 300A with the "image IDs" recorded in the IC tags 600B and 600C on the other print images 300B and 300C to confirm that a complete set of print images is prepared and that any print image under another order is not included. If the confirmation of these items fails, the display section 24 displays an error notification. If the confirmation of these items succeeds, the pricing processing section 22 calculates the printing fee based on the "print size" and "surface treatment type" recorded in the IC tags 600B and 600C and the prices stored in the price DB 25. The calculated printing fee and the details of the order are printed by the slip printing section 23.

In this way, using the information recorded in the IC tag allows easy and accurate calculation of the printing fee. In addition, since the information recorded in the IC tag is used to confirm the details of the order, a complicated confirmation can be omitted, and missing of a print image or inclusion of a print image under another order can be prevented with reliability.

Here, in the example described above, information, such as the image ID or the date of photograph, is recorded in the IC tag. However, the memory element according to the present invention may store the following information:

1. information about photographic conditions (whether the flash lamp is used or not, the Ev value, the shutter speed, the F number, the photographing mode, the model of the camera, information about lenses, the object distance, the date of photograph, or the Exif information);

2. information about the object (the name of the object, and the place of photograph);

3. information about image processing (details of the processing, and correction information); and 4. information about the order (the order number, the customer name, details of the order and the price).

For example, the information about photographic conditions and the information about the object can be utilized when seeing the image, the information about image processing can be utilized when a similar order is to be placed again, and the information about the order can be utilized when pricing.

In addition, in the example described above, the information recorded in the IC tag is used by the pricing device. However, the information recorded in the memory element according to the resent invention may be used not only by the pricing device but also for placing a repeat order or controlling the image forming process.

In addition, in the example described above, the sheet of paper used is composed of a base and a resin layer. However, the sheet of paper according to the present invention may be composed of three or more layers, as far as it includes a first layer serving as a base and a thermoplastic second layer constituting the surface of the sheet.

Furthermore, an inkjet printer may be disposed downstream of the secondary fixing section, and an antenna may be recorded on the sheet of paper and connected to the IC tag. Connecting the antenna to the IC tag can improve the sensitivity of the IC tag.

What is claimed is:

1. A memory element mounting method, comprising:

a disposing step of disposing a memory element including an integrated circuit at a sheet of paper that is composed of a plurality of layers including a first layer serving as a base and a second layer serving as a surface with a thermoplasticity; and a surface treatment step of melting at least the surface of the sheet of paper at which the memory element is disposed in the disposing step and processing the molten surface of the sheet of paper into a predetermined surface shape, wherein the disposing step includes a holding step of holding the sheet of paper by pressing the sheet of paper, an embedding step of embedding the memory element into the first layer of the sheet of paper by inserting a memory element insertion needle into the first layer from a side of the sheet of paper held in the holding step and by making the memory element insertion needle push out the memory element, wherein the memory element insertion needle has the memory element and pushes out the memory element from a tip portion of the memory element insertion needle, and a filling step of filling, with an adhesive, a hole on the side of the sheet of paper formed due to the insertion of the memory element insertion needle in the embedding step, by inserting an adhesive injection needle into the hole and by making the adhesive injection needle push out the adhesive, wherein the adhesive injection needle has the adhesive and pushes out the adhesive from a tip portion of the adhesive injection needle.

2. An image forming apparatus, comprising:

a toner image forming section that forms a toner image on a surface of a sheet of paper that is composed of a plurality of layers including a first layer serving as a base and a second layer serving as a surface with a thermoplasticity;

a disposing section that disposes a memory element including an integrated circuit at the sheet of paper; and a surface treatment section that melts at least the surface of the sheet of paper at which the memory element is disposed by the disposing section and processes the molten surface of the sheet of paper into a predetermined surface shape, wherein the disposing section includes a holding section that holds the sheet of paper by pressing the sheet of paper, an embedding section that embeds the memory element into the first layer of the sheet of paper by inserting a memory element insertion needle into the first layer from a side of the sheet of paper held by the holding section and by making the memory element insertion needle push out the memory element, wherein the memory element insertion needle has the memory element and pushes out the memory element from a tip portion of the memory element insertion needle, and a filling section that fills, with an adhesive, a hole on the side of the sheet of paper formed due to the insertion of the memory element insertion needle by the embedding section, by inserting an adhesive injection needle into the hole and by making the adhesive injection needle push out the adhesive, wherein the adhesive injection needle has the adhesive and pushes out the adhesive from a tip portion of the adhesive injection needle.

* * * * *